United States Patent
Ellmauthaler et al.

(10) Patent No.: US 11,977,195 B2
(45) Date of Patent: May 7, 2024

(54) TRIGGERING DISTRIBUTED ACOUSTIC SENSING DOWNHOLE USING AN ACTIVE FIBER STRETCHER ASSEMBLY

(71) Applicant: Halliburton Energy Services, Inc., Houston, TX (US)

(72) Inventors: Andreas Ellmauthaler, Houston, TX (US); Henry Clifford Bland, Calgary (CA); Michel Joseph LeBlanc, Houston, TX (US); Mark Elliott Willis, Katy, TX (US); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 265 days.

(21) Appl. No.: 17/620,269

(22) PCT Filed: Sep. 20, 2019

(86) PCT No.: PCT/US2019/052121
§ 371 (c)(1),
(2) Date: Dec. 17, 2021

(87) PCT Pub. No.: WO2021/054969
PCT Pub. Date: Mar. 25, 2021

(65) Prior Publication Data
US 2023/0020858 A1 Jan. 19, 2023

(51) Int. Cl.
*G01D 5/353* (2006.01)
*G01V 1/22* (2006.01)
(Continued)

(52) U.S. Cl.
CPC ............ *G01V 1/26* (2013.01); *G01D 5/3537* (2013.01); *G01V 1/226* (2013.01); *G01V 1/46* (2013.01); *G01V 2210/1429* (2013.01)

(58) Field of Classification Search
None
See application file for complete search history.

(56) References Cited

U.S. PATENT DOCUMENTS 10,184,332 B2 * 1/2019 Samson ................. E21B 47/14
11,125,909 B2 * 9/2021 Farhadiroushan ..... G01V 11/00
(Continued)

FOREIGN PATENT DOCUMENTS

WO    WO-2012137022 A2 * 10/2012  .............. G01D 1/00

OTHER PUBLICATIONS

Halliburton, "Distributed Acoustic Sending (DAS) for VSP", 2019, 2 pages.
(Continued)

*Primary Examiner* — Curtis A Kuntz
*Assistant Examiner* — Jerold B Murphy
(74) *Attorney, Agent, or Firm* — Kilpatrick Townsend & Stockton LLP

(57) ABSTRACT

An active fiber stretcher assembly can be used for data acquisition systems. A time-break signal can be detected that coincides with a seismic event emitted from a seismic controller. A predetermined waveform can be generated in response to detecting the time-break signal. The predetermined waveform may be encoded onto a fiber optic cable using a fiber stretcher. A data acquisition system connected to the fiber optic cable may detect the predetermined waveform on the fiber optic cable and initiate acquisition operations including: receiving, during the seismic event, light signals returning from a portion of the fiber optic cable in a subterranean environment; determining one or more characteristics of the subterranean environment from the light signals; and storing the one or more characteristics.

18 Claims, 9 Drawing Sheets

(51) Int. Cl.
    *G01V 1/26*     (2006.01)
    *G01V 1/46*     (2006.01)

(56) References Cited

U.S. PATENT DOCUMENTS

| | | | |
|---|---|---|---|
| 2005/0058462 A1* | 3/2005 | Talebpour | H04B 10/2563 |
| | | | 398/199 |
| 2010/0145622 A1 | 6/2010 | Haque et al. | |
| 2012/0067118 A1 | 3/2012 | Hartog et al. | |
| 2013/0167628 A1* | 7/2013 | Hull | E21B 47/107 |
| | | | 73/152.58 |
| 2014/0064742 A1* | 3/2014 | Barfoot | G01V 1/26 |
| | | | 398/154 |
| 2015/0285064 A1 | 10/2015 | Farhadiroushan et al. | |
| 2018/0340898 A1 | 11/2018 | Arsenault et al. | |

OTHER PUBLICATIONS

International Application No. PCT/US2019/052121, International Search Report and Written Opinion, mailed on Jun. 16, 2020, 13 pages.

\* cited by examiner

TRIGGERING DISTRIBUTED ACOUSTIC SENSING DOWNHOLE USING AN ACTIVE FIBER STRETCHER ASSEMBLY

TECHNICAL FIELD

The present disclosure relates generally to data acquisition systems for wellbore operations. More particularly, the present disclosure relates to seismic data acquisition systems and configuring the same.

BACKGROUND

Data acquisition systems measure acoustic waves generated from a seismic event occurring in a subterranean environment. In some instances, the material composition of the environment can be identified by generating a seismic event and measuring the generated acoustic wave. Examples of materials that may be identifiable include, but are not limited to, geological formations, rock, dirt, sand, petroleum, water, combinations therefor, and the like. For example, a seismic event may be generated by thumper truck, air gun, explosives, or by any source that can generate an acoustic wave in the subterranean environment. The acoustic wave may travel through different materials differently. For example, the acoustic wave may travel faster through dense materials such as metal or solid rock than through less dense materials like sand or dirt. Data acquisition systems may detect the acoustic wave as it travels within the subterranean environment and through detection of its altered characteristics, identifying the composition of the subterranean environment.

For the measurements to be recorded accurately, a data acquisition device begins recording the instant at which the seismic event occurs. Generally, seismic controllers, which trigger the seismic event, are manufactured from a variety of sources, each of which may transmit a different trigger signal to data acquisition systems. The particular trigger signal for a particular seismic controller is known to field engineers in advance to calibrate a data acquisition system. Some types of trigger signals may have higher likelihood of causing false positives or false negatives causing significant loss of data, collection of false data, or an increase in time and complexity of managing field operations.

DETAILED DESCRIPTION

Certain aspects and features relate to an active fiber stretcher assembly for triggering data collection operations within a subterranean environment. The active fiber stretcher assembly can actively detect arbitrary signals from a seismic controller and can use a fiber stretcher to encode a trigger signal onto a fiber optic cable. The active fiber stretcher assembly can detect a signal that is transmitted from a seismic controller substantially concurrently with a seismic event. In response to detecting the arbitrary signal, the active fiber stretcher assembly may generate a predetermined trigger signal. A fiber stretcher may encode the electrical trigger signal onto a fiber optic cable for transmitting the predetermined signal to a data acquisition system. Once the data acquisition system detects the predetermined signal on the fiber optic cable, the data acquisition system may collect measurements about a subterranean environment corresponding to the seismic event. The measurements can include changes to the characteristics of a backscattered light pulse affected by an acoustic wave within the subterranean environment. The active fiber stretcher assembly can automatically configure data acquisition systems to detect trigger signals, increase the accuracy of trigger signal detection by data acquisition systems, and increase the data acquisition system's resilience to broadband noise, common-mode noise potentially affecting the trigger signal.

Data acquisition systems may initiate data collection operations upon receiving a trigger signal from a seismic controller of the seismic event source. In some instances, the trigger signal may be encoded by a fiber stretcher onto the fiber optic cable that is buried in the subterranean environment. The trigger signal may be transmitted substantially contemporaneously with the seismic event being initiated or some predetermined time interval prior such that the subsequent measurements collected by the data acquisition system may be based on the induced acoustic wave rather than naturally occurring unknown acoustic waves. Since the accuracy of any collected measurements may be based on the accuracy of detecting the trigger signal from the seismic source, an active fiber stretcher assembly can improve the accuracy of trigger signal detection and thereby improve the accuracy of collected measurements and the determination of the material composition of the subterranean environment.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
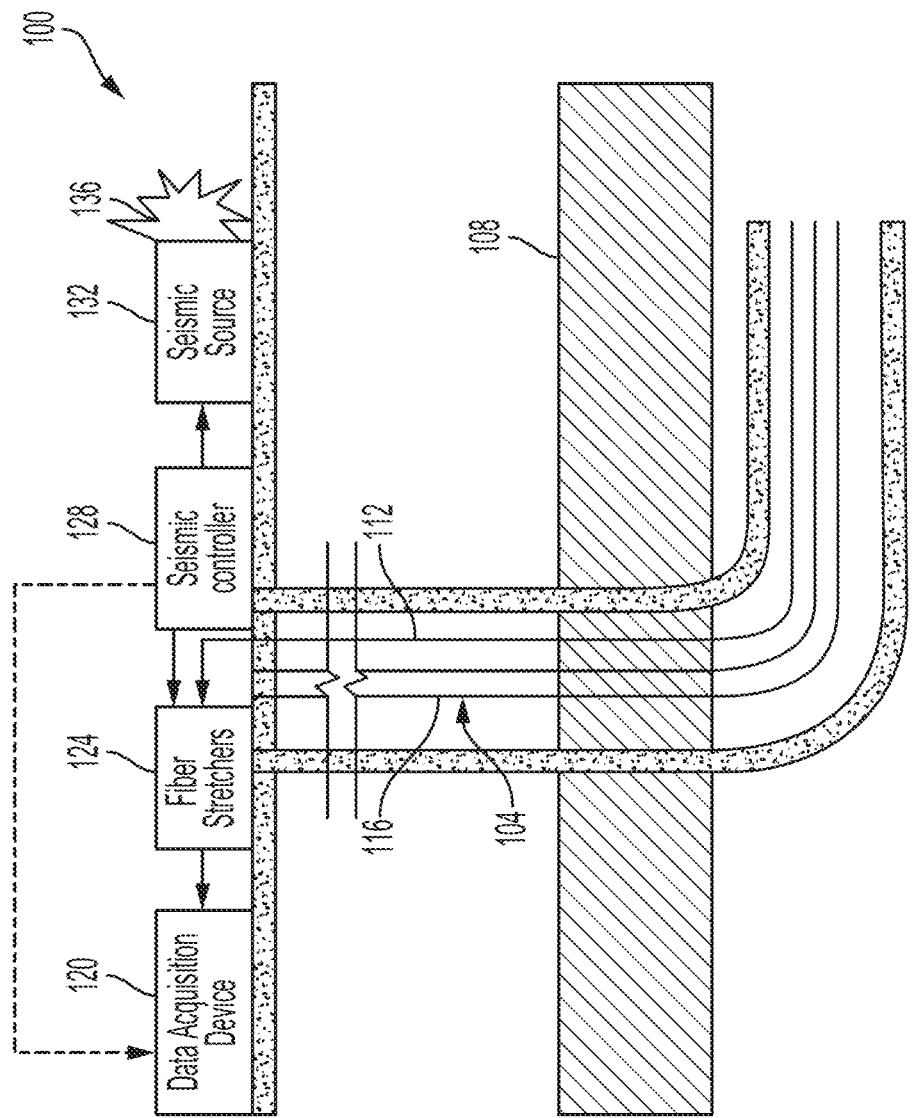
FIG. 1 is a cross-sectional view of a portion of a well environment in which distributed acoustic sensing can be performed according to one aspect of the disclosure.

FIG. 1 is a cross-sectional view of a portion of a well environment configured for distributed acoustic sensing. Well environment 100 includes a wellbore 104 in a formation 108. The wellbore may include fiber optic cable 112 used as a sensing element for a distributed acoustic sensing system that is configured to monitor the status of the well and the subterranean environment. Fiber optic cable can be placed into a well environment for data acquisition operations described herein at any stage of the well (e.g., drilling, completion, extraction, etc.). For example, well environment 100 can include a tubing string 116 that can pump fluid into the wellbore for hydraulic fracturing. Fiber optic cable 112 may be used to monitor well environment 100 during use of tubing string and immediately thereafter. One end of fiber optic cable 112 may extend into the subterranean environment of the wellbore. The other end of fiber optic cable 112 may be connected to data acquisition device 120 and fiber stretchers 124.

Seismic controller 128 may issue a command to seismic source 132 to generate seismic event 136. Substantially concurrently with the transmission of the command, seismic controller may also transmit a trigger signal to data acquisition device 120 to inform data acquisition device 120 that seismic event 136 is or will be occurring. In some instances, the trigger signal may be encoded onto fiber optic cable 112 by one or more of fiber stretchers 124. Fiber stretchers can be used to encode electrical signals into optical signals for retransmission through a fiber optic cable, such as fiber optic cable 112. Data acquisition device 120 can detect the trigger signal from the seismic controller and initiate data acquisition operations by transmitting a light pulse into the subterranean environment using fiber optic cable 112.

Figure 2A:
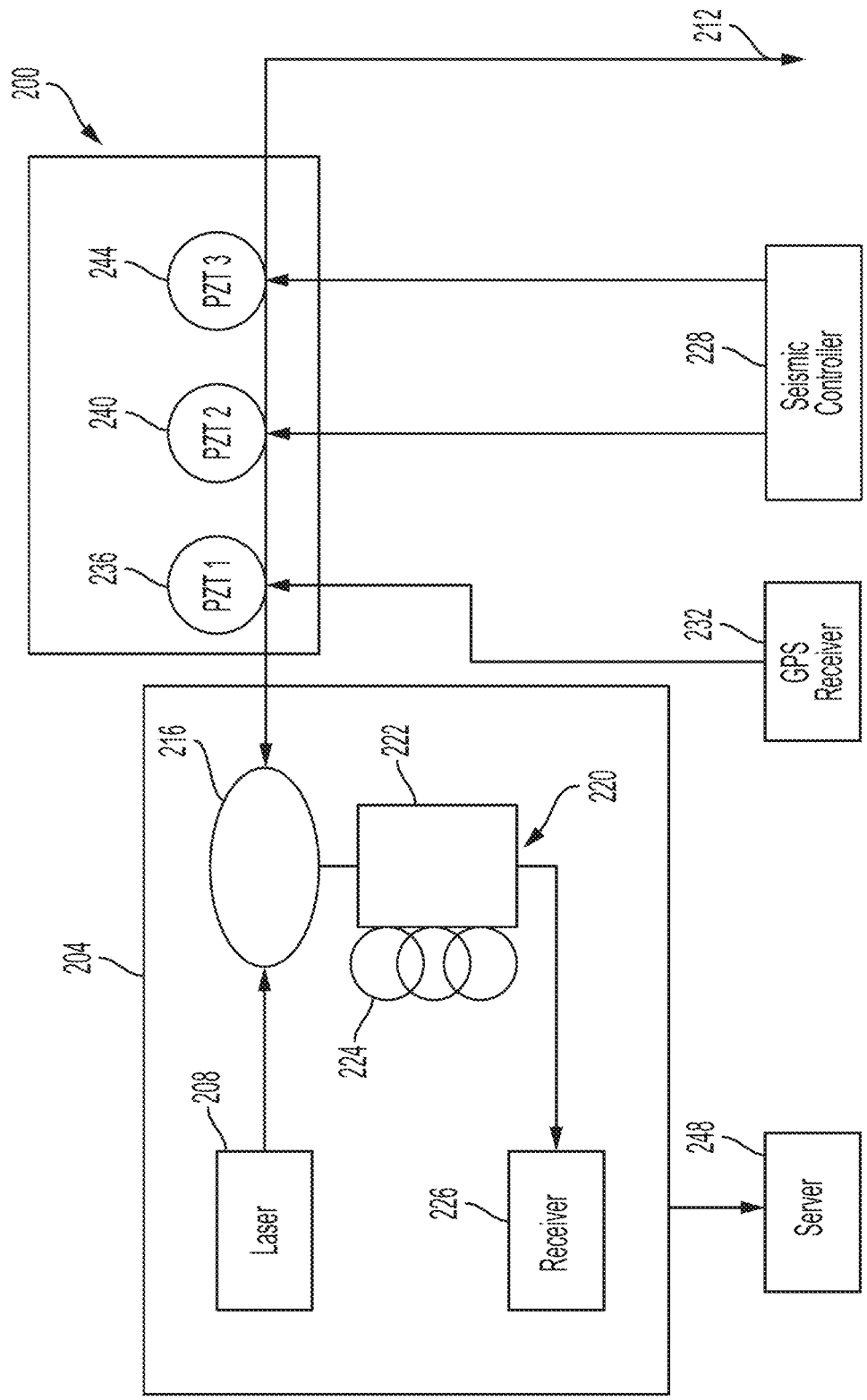
FIG. 2A is a block diagram of a data acquisition device according to one aspect of the disclosure.

FIG. 2A is a block diagram of a data acquisition system 200 according to one aspect of the present disclosure. In some instances, the data acquisition system 200 may be a vertical seismic profile data acquisition system that can be used as a part of a distributed acoustic sensing (DAS) platform. Data acquisition system 200 may be used for reservoir characterization and monitoring hydraulic fracturing operations. Data acquisition system 200 includes a DAS interrogator 204 that, upon detecting a trigger signal, can obtain measurements of backscattered light signals received from a fiber optic cable embedded in a subterranean environment.

DAS interrogator 204 may include a laser 208 that can transmit light pulses into the subterranean environment through a fiber optic cable 212 embedded into the subterranean environment. During a seismic event, an acoustic wave passing through the subterranean environment may affect a characteristic of light that is within the fiber optic cable. Examples of the characteristic of light include frequency, amplitude, polarization, Brillouin frequency, and phase. The altered light may return to DAS interrogator 204. For example, the altered light can be returned via return transmission, backscatter, mirror, etc.

For each light pulse that is transmitted into the fiber cable, multiple returning light signals may be received. For example, the returning light signals can include backscatter signals, where the light pulse is continuously reflected back towards the source until the forward propagating light pulse reaches the end of the fiber optic cable. Backscatter may also be induced at particular locations along the fiber optic cable to generate a predetermined number of returning light signals. For example, a backscatter signal may be generated at any particular interval of the fiber optic cable. Examples of intervals can be every 1 millimeter, 10 millimeters, 100 millimeters. Any backscattering technique may be used. Examples of suitable backscattering techniques include Rayleigh, Brillouin, Raman, Fiber Bragg Grating, or the like.

The returning light signals may be received by circulator 216. Circulator 216 may direct light pulses in a clockwise direction or a counterclockwise direction to the next output. For instance, circulator 216 may operate in a clockwise orientation such that laser 208 is directed to fiber optic cable 212 embedded in the subterranean environment. Returning light signals from the environment may be directed clockwise to reference interferometer 220, and receiver 226. Circulator 216 may include any number of connections and operate in any direction.

The returning light signals may be received by reference interferometer 220. In some instances, the returning light signals may be received sequentially. For example, the backscatter signal generated at position $p_0$, the closest location along the fiber optic cable to DAS interrogator 204, may be received first. The backscatter signal generated at the next position along the fiber optic cable, $p_1$, may be received second, and so on. The light entering reference interferometer 220 may be split into two or more paths such as: a baseline path 222 and a delay path 224 where the delay path 224 can be longer than the baseline path. When the delay path 224 is longer than the propagation length of the laser, backscatter from two different sections of the sensing fiber are made to interfere with each other at detector 224. The path length difference between delay path 224 and baseline path 222 may also be referred to as gauge length. The backscatter from a section of fiber 212 that is closer to DAS interrogator 204 and travelling through the delay path 224 will arrive at detector 224 at the same time as backscatter light from a section of the sensing fiber 212 further away from DAS interrogator 204 but having travelled through the baseline path 222. The gauge length may determine the separation length between the interfering backscatter light along the optical fiber. Optical fiber cable 212 may be much longer than the gauge length.

The time interval between pulse launch time instances $T_0$, $T_1$, $T_n$, etc., may be any interval of time such as, but not limited to, 1 microsecond, 1 milliseconds, or any interval of time selected by an operator of DAS interrogator 204. The interval of time can be set such that all the backscatter light from fiber optic cable 212 due to a single pulse may be received by reference interferometer 220 before a subsequent pulse is launched into fiber optic cable 212.

For instance, the separation in time between a light pulse being generated and the arrival of the backscatter light may be proportional to the distance along optical fiber cable 212 where the backscatter light originated. The arrival time may correspond to two different sections of the fiber separated by the gauge length, when using reference interferometer 220. Rayleigh backscatter from the two fiber sections may interfere and the resulting signal may correspond to disturbances along the section of fiber optic cable 212 between the two fiber sections.

A seismic or acoustic wave travelling through a formation may include small movements (displacement) of the atoms within rock or fluid within the formation. These movements can be transferred to optical fiber cable 212 through adhesion, for example due to the cable being cemented behind a casing, by friction, or by acoustic coupling such as a pressure wave. The transference may cause variations of strain inside the fiber which may induce changes in phase in the interference signals measured by DAS interrogator 204. DAS interrogator 204 may monitor the fiber optic cable 212 to detect the strain changes generated by the seismic or acoustic waves. Monitoring strain changes as a function of time and space along fiber optic cable 212 may enable detection of the effect of the seismic or acoustic wave. For instances, the amplitude, frequency, and phase of the seismic or acoustic wave can be determined in addition to the effect of the formation on the wave propagation.

Seismic controllers 228 may transmit a trigger signal to data acquisition system 200 to initiate data acquisition operations such that DAS interrogator 204 performs measurements associated with a seismic event. Seismic controller 228 may be located at a seismic source or at any other location. Examples of seismic sources can include a thumper truck, air gun, vibratory sources, explosives, or any other device that is configured to pump energy into the subterranean environment to cause a seismic event.

Seismic controller 228 may emit a predetermined trigger signal such as a digital or analog signal. Different seismic controllers may transmit signals with different characteristics from other seismic controllers. Examples of signal characteristics that may differ include frequency, signal length, edge width, pulse width, magnitude, polarity, combinations thereof, or the like. An operator of the data acquisition system 200 may configure data acquisition system 200 to accept the particular signal transmitted by seismic controller 228 before field operations can be commenced. Data acquisition system 200 can detect a trigger signal provided that both of the following equations are satisfied:

$$x(t+EW)-x(t)>T \quad \text{(Eq. 1)}$$

and $$x(t+PW-EW)-x(t+PW)>T, \quad \text{(Eq. 2)}$$

where EW is the edge-width, T is a threshold value, which can be based on the amplitude of the trigger signal, PW is the pulse-width, and x(t) is a phase measurement at time t.

Seismic controller 228 may also transmit a pilot seismic signal to data acquisition device 204. A pilot seismic signal may represent the predetermined acoustic wave that may be traveling through the subterranean environment. The pilot seismic signal may be used post real-time, after data acquisition system captured the measurements corresponding to the seismic event, for in-field correlation, quality control, as well as to maintain acquisition parameters. A GPS receiver 232 may transmit a timing signal to data acquisition device 204 that may also be used in post real-time in-field correlation to match pilot seismic signal with the measurements corresponding to the seismic event from fiber optic cable 212.

The trigger signal, pilot seismic signal, and the GPS signal, may be encoded onto a fiber optic cable 212 via fiber stretchers 236, 240, 244. A fiber stretcher can include a length of fiber optic cable wrapped around a piezoelectric core, such as, but not limited to, lead zirconate titanate (PZT), etc. An electrical field applied to the piezoelectric material can cause the piezoelectric material to change shape, thereby stretching the optical fiber. This will increase the optical path length of the optical fiber, thereby changing a phase of an optical signal within the fiber optic cable. This may be used to encode an electrical signal onto a fiber optic cable.

DAS interrogator 204 may parse light signals to differentiate the GPS signal, trigger signal, and pilot-sweep signal, from other signals that may be transmitted via fiber optic cable 21, for example, by taking advantage of the different arrival times of the backscattered light corresponding to the physical locations of fiber stretchers 236, 240, 244. The received signals may be converted from optical signals to electrical signals. The analog signals can be converted to digital signals. The conversion from optical to electrical and from analog to digital may be performed by specialized hardware or through software instructions executed by a processer of data acquisition system 200. In some instances, the signals may be converted into electrical signals by data acquisition system 200 and transmitted to a server. The server may convert the signals into digital signals and provide other data acquisition operations.

Fiber stretchers 236, 240, 244 may be located externally from DAS interrogator 204, seismic controller 228 and GPS receiver 232. In some instances, the fiber stretchers 236, 240, 244 may be located within a same housing that is positioned on the fiber optic cable 212 between the subterranean environment and DAS interrogator 204. In other instances, the fiber stretchers 236, 240, 244 may be located separately at various positions of fiber optic cable 212 between the subterranean environment and DAS interrogator 204, n other instances, fiber stretchers 236, 240, 244 may be within seismic controller 236 or DAS interrogator 204.

In some instances, DAS interrogator 204 may transmit the received light signals from the subterranean environment to at least one data acquisition server 248. Data acquisition server 248 may process the received signals to derive the data that characterizes the subterranean environment. DAS interrogator 204 may additionally transmit the GPS signal from GPS receiver 232 as well as the trigger and pilot seismic signals from seismic controller 228 to the data acquisition server 248. DAS interrogator 204 may transmit the signals via a wired or wireless connection with the data acquisition server 248. In some instances, DAS interrogator 204 may be incorporated within data acquisition server 248. In other instances, DAS interrogator 204 can process the received light signals internally, using one or more processors (not shown).

Figure 2B:
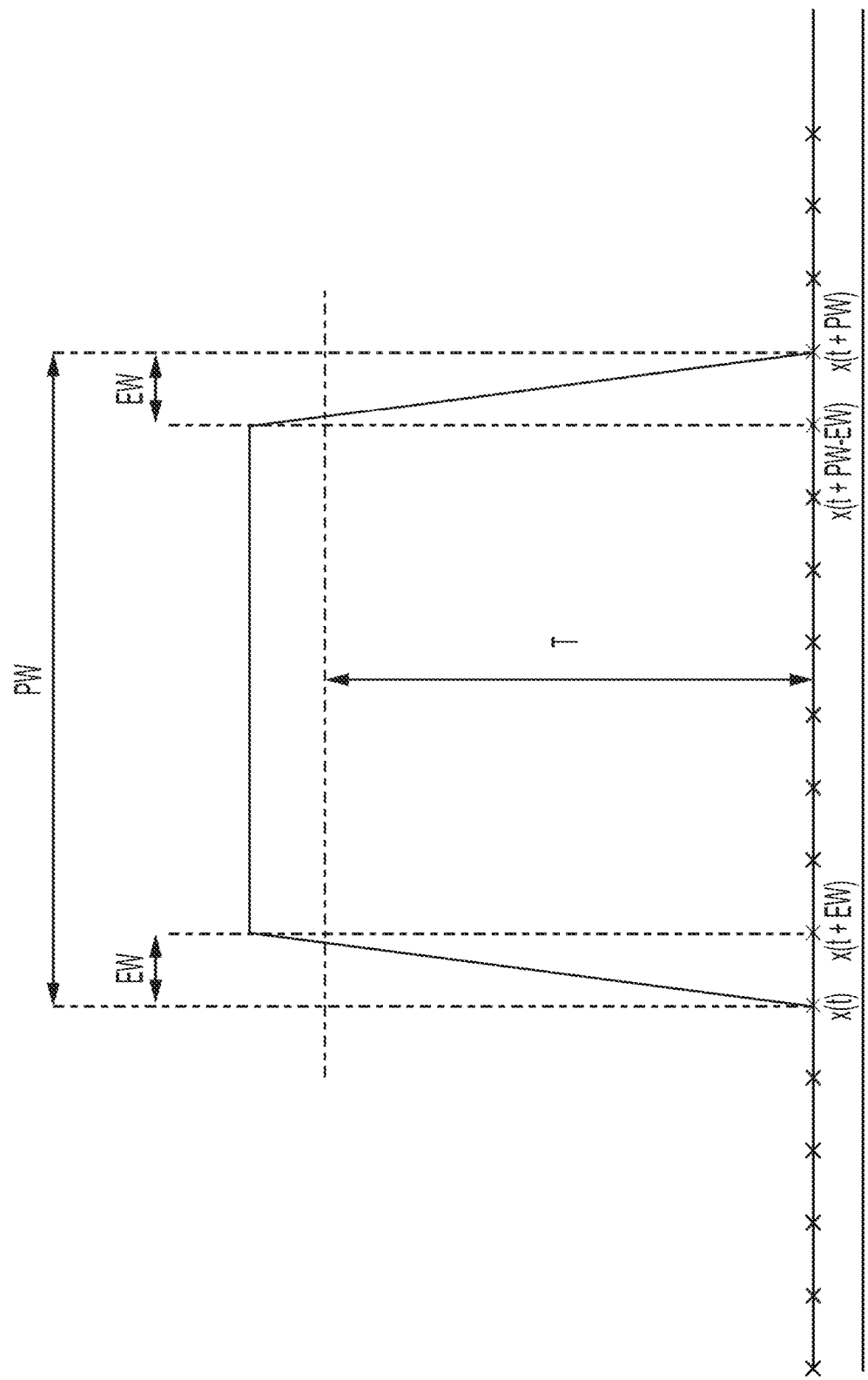
FIG. 2B is a diagram of a trigger signal that may be used to trigger data acquisition operations according to at least one aspect of the disclosure.

FIG. 2B is a diagram of a trigger signal that may be used to trigger data acquisition operations according to at least one aspect of the disclosure. The trigger signal may include a predetermined pulse width, PW, and amplitude. In some instances, noise may affect one or more properties of the signal, such as the amplitude of the received signal. A threshold value, T, may be used to enable detection of the trigger signal even in situations where the full amplitude of the signal cannot be detected. The threshold value may be any predetermined or dynamically selected value. In some instances, the threshold value may be selected based on a confidence factor that indicates a probability that the received signal is the trigger signal. For instance, if the threshold value is too low, noise or other non-trigger signals may be mistaken for the trigger signal. If the trigger signal is set too high, noise or other interference may prevent the amplitude from reaching the threshold value such that the trigger signal may never be detected. The threshold value may be selected at value such that other signals, noise, or interference are not likely to create a false positive or false negative.

In some instances, it may take a time interval before the trigger signal reaches the threshold voltage or the maximum amplitude. For instance, the leading edge of the signal may have an edge width, EW, that is equal to the time interval between the beginning of the pulse width and ending upon reaching the maximum amplitude of the trigger signal. The edge width may be an artifact of the seismic controller or active fiver stretcher assembly or selected by an operator. For instance, an edge width may be selected and used as a characteristic of the trigger signal that determines detection of the signal. In some instances, if a signal is received where the amplitude difference between two points, separated by the edge width, exceeds the threshold value, the trigger can be detected without waiting to detect the entire pulse width. The edge width may appear on the leading edge and trailing edge of the pulse width.

As shown in FIG. 2B, the signal may be represented by an initial time, x(t) in which the pulse width of the signal is initiated. The amplitude of the signal may increase during the leading edge width of the pulse width. In some instances, during the edge width the amplitude may change linearly as shown, logarithmically, or exponentially. The maximum amplitude of the trigger signal may not be reached until the expiration of the leading edge width x(t+EW). The threshold value may be reached at some time, x, between x(t) and x(t+EW). At time x(t+PW−EW) the trailing edge width begins such that the amplitude of the signal begins to decline to zero. The amplitude of the signal may not reach zero until the end of the trailing edge width at x(t+PW). Though the pulse width extends from x(t) to x(t+PW) the trigger signal may only be detected for some time less that PW−2EW due to the threshold value being less than the maximum amplitude of the trigger signal. Any one or more characteristics of the trigger signal may be used identify the trigger signal. For instance, the leading edge width, the pulse width, the trailing pulse width, the threshold value, or the time interval of the threshold value or maximum amplitude PW−2EW or combinations thereof may be used.

Figure 3:
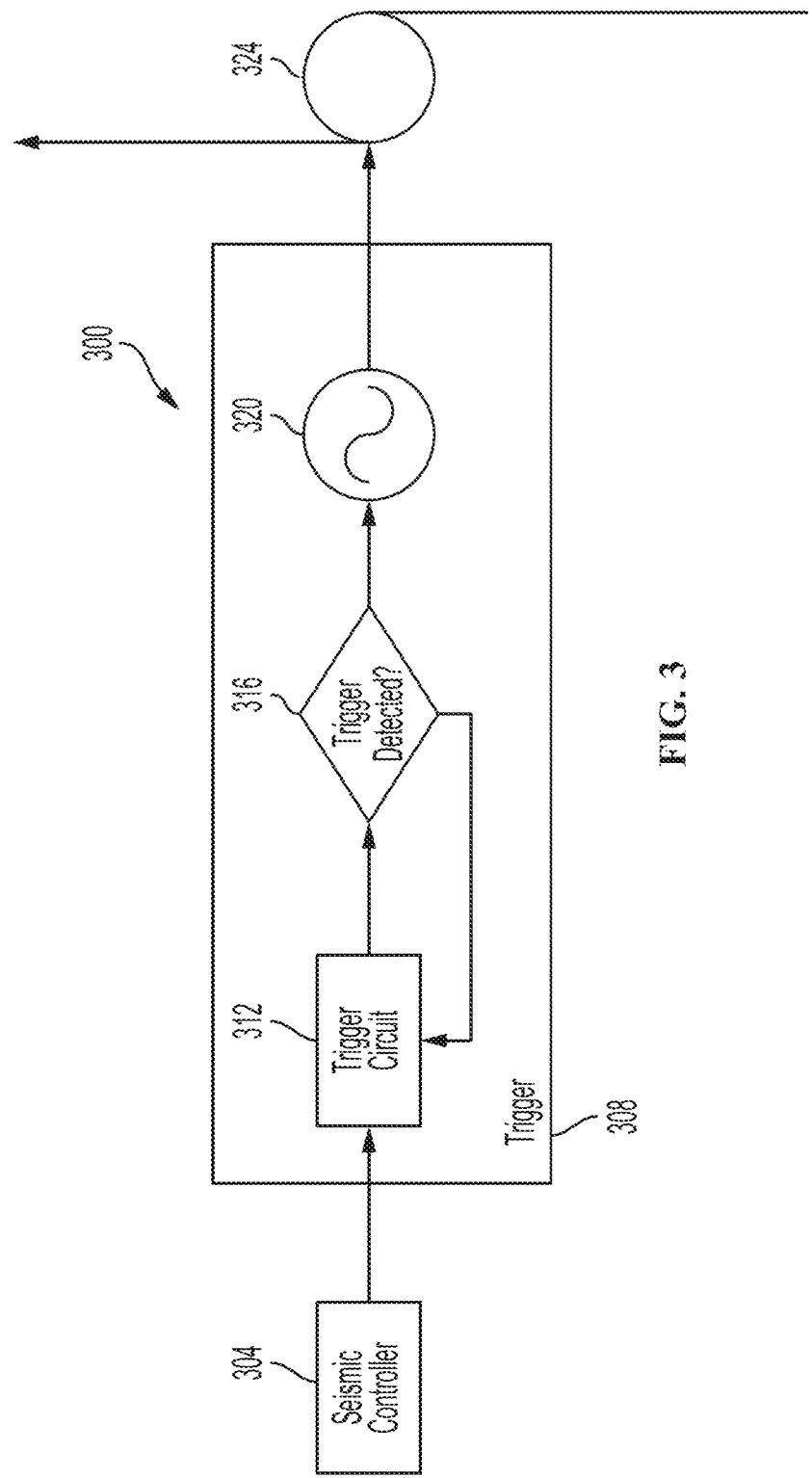
FIG. 3 is a block diagram of an active fiber stretcher system according to at least one aspect of the disclosure.

FIG. 3 is a block diagram of an active fiber stretcher assembly 300. Active fiber stretcher assembly 300 detects signals from a signal source, such as a seismic controller, without being preconfigured to detect any particular signal emitted from the signal source and transmits a predetermined signal. Active fiber stretcher assembly 300 can be used with a data acquisition system to initiate seismic measurements without first preconfiguring the data acquisition system to the particular trigger signal used by a seismic controller. This may reduce the chance of a false positive or false negative trigger signal detection at the data acquisition system due to broadband noise, common-mode noise, improper configuration, etc.

Active fiber stretcher assembly 300 can include trigger 308 that receives a trigger signal from seismic controller 304. Examples of possible triggers signals can include, but are not limited to: an analog signal, a digital signal such as a step function, a transistor-to-transistor logic (TTL) signal, etc. The trigger signal may be predetermined such as signals with an expected polarity, duration, edge width, etc. or arbitrary. Trigger 308 may include a trigger circuit 312 that detects particular characteristics of the trigger signal. In some instances, trigger circuit 312 detects the entire trigger signal before indicating that the trigger signal has been detected. In other instances, detection of the trigger signal may be triggered based on detecting one or more characteristics of the trigger signal. For example, trigger circuit may indicate the trigger signal has been detected upon detecting a leading edge of a TTL signal or a trailing edge.

Upon detecting the trigger signal, trigger circuit may output a trigger event. At 316, it is determined whether the trigger event has occurred. If the trigger event has not yet occurred, trigger 308 may wait until the trigger signal is detected. A trigger event being detected at 316 may cause function generator 320 to generate an operator-configured signal. Any type of signal may be generated such as, but not limited to: (1) a TTL pulse with fixed polarity, pulse width, and edge width. (2) a TTL pulse train with fixed or varying polarity, pulse width, and edge width, (3) a modulated, time-limited signal such as a signal with amplitude modulation, frequency modulation, phase modulation, or a spread spectrum utilizing random or pseudo-random sequences, or (4) a continuous signal, such as a carrier tone which may be modulated to indicate the trigger condition. For example, the continuous signal may be modulated by shifting the phase of the continuous signal 180 degrees or any other n degrees.

Function generator 320 may transmit the generated function to fiber stretcher 324 to encode the generated function onto a fiber optic cable. Fiber stretcher 324 may encode the generated function on the same fiber optic cable embedded into the subterranean environment or on another fiber optic cable connected to the data acquisition system. Trigger 308 may be positioned at a seismic controller, within a data acquisition device, or anywhere in-between.

Data acquisition device can be automatically configured to detect a TTL pulse or a TTL pulse train since the pulse width, edge width, and polarity may be predetermined by the active fiber stretcher system. For example, data acquisition device may use Equations 1 & 2 (described above). For modulated signals, the signal may be demodulated before the two equations are used to detect a trigger signal. In some instances, a cross-correlation may be used in place of or in conjunction with the above two equations to detect the trigger signal.

In some instances, function generator 320 may generate a continuous signal such as a carrier wave at any particular frequency. For example, carrier wave at 2 KHz may be used. A DAS interrogator may then continuously receive the signal, forward it to a data acquisition server which may detect a trigger condition upon detecting a variation of the continuous signal. For example, the trigger event at 316 may cause function generator 320 to modulate the continuous signal for a predetermined time interval, such as, and by example only, one or more of the amplitude, phase, or frequency. The signal may be modulated for any selected interval of time. At the instant of triggering, the change in modulation can be detected by data acquisition system to trigger data acquisition operations. A continuous signal may provide an advantage of detecting faults in the connection path between the data acquisition device and trigger 308.

Figure 4:
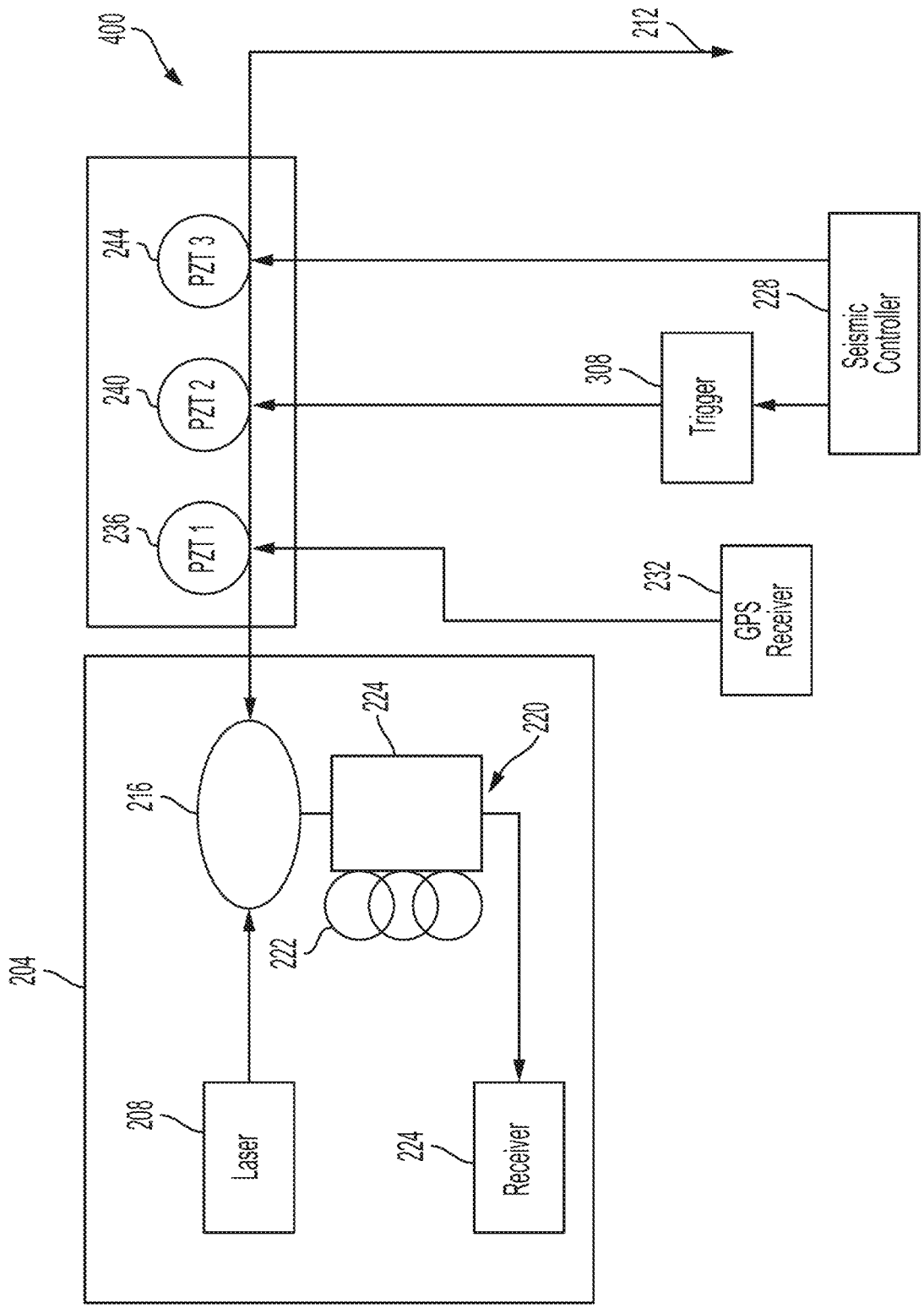
FIG. 4 is a block diagram of an active fiber stretcher system as used with a data acquisition system according to at least one aspect of the disclosure.

FIG. 4 is a block diagram of an active fiber stretcher system as used with a data acquisition system according to aspects of the disclosure. Trigger 308 may be positioned on the signal path between seismic controller 228 and fiber stretcher 240. For example, trigger 308 may be positioned at or near seismic controller 228. In other instances, trigger 308 may be positioned at or near fiber stretcher 240. In still yet other instances, trigger 308 may be positioned at any position between seismic controller 228 and fiber stretcher 240.

In some instances, trigger 308 may be positioned within seismic controller 228. In those instances, trigger 308 may be remotely configurable by an operator of DAS interrogator 204 or data acquisition server 248 (not shown in FIG. 4). For example, an operator of DAS interrogator 204, may remotely configure trigger 308 to transmit any selected trigger signal.

Figure 5:
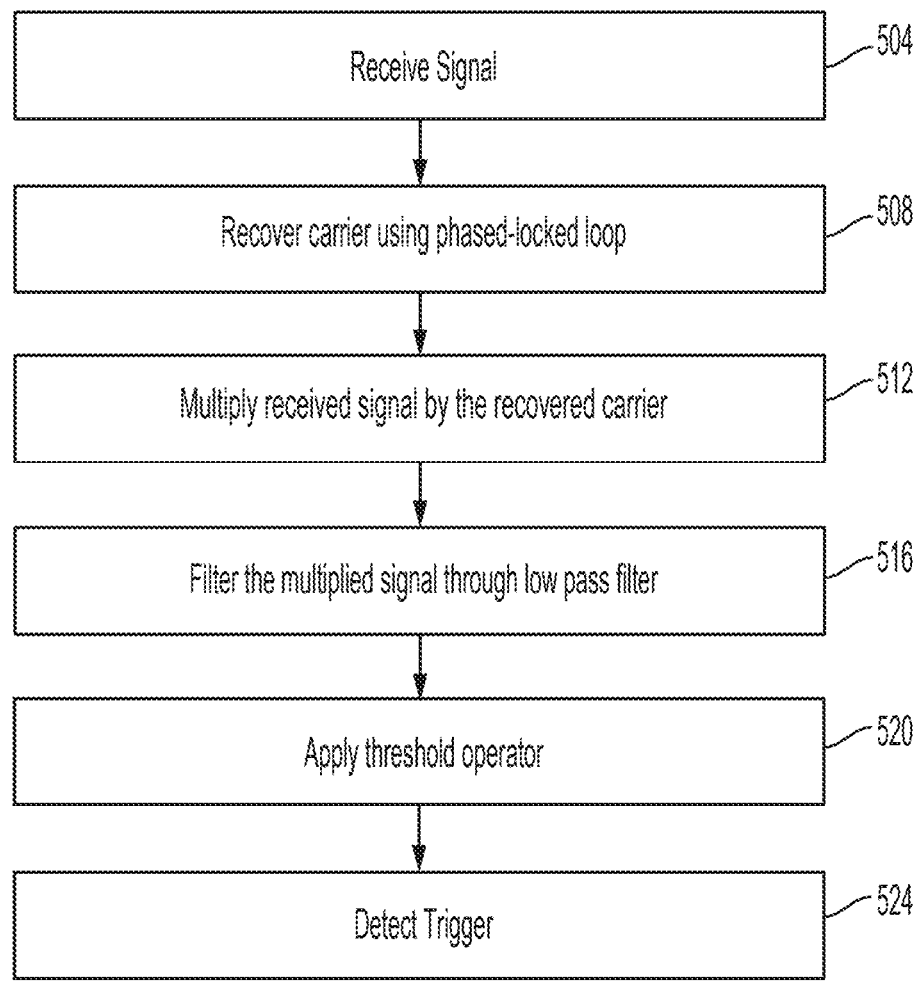
FIG. 5 is a flowchart of a process for detecting a trigger signal for a data acquisition system according to at least one aspect of the disclosure.

FIG. 5 is a flowchart of a process for detecting a trigger signal embedded into a continuous signal such as a carrier wave, by a data acquisition system according to one aspect of the disclosure. At block 504, a continuous signal is received. The continuous signal may have a fixed frequency, phase, or amplitude. A trigger signal may be embedded into the continuous signal by temporarily modulating the frequency, phase, or amplitude of the continuous signal. At block 508, the signal may passed through a phase-locked loop (PLL). A PLL may generate an output signal with a fixed frequency or phase that is a representation of a modulation to the continuous signal. If no trigger modulation is added to the continuous signal, the output generated by the PLL is the input signal, which is the continuous signal. When a modulation is added to the continuous signal, the PLL generates an output signal that is the difference between the continuous signal and the modulated continuous signal. In other words, the output of the PLL is the modulation added to the continuous signal.

A PLL may include a phase detector that takes two input signals, the continuous signal and a feedback signal, and outputs a signal with a phase equal to the phase difference between the two input signals. The output from the phase detector may be passed through a low-pass filter to suppress higher-frequency components of the signal. The output from the low-pass filter may be passed to a voltage-controlled oscillator that generates an output signal with a frequency equal to the voltage of the input signal from the low-pass filter. The output from the voltage-controlled oscillator may be both the output of the PLL as well as the feedback signal that is used as input by the phase detector. Since the output of the PLL is equal to the continuous signal when the continuous signal is not modulated, the introduction of a modulated continuous signal may cause the phase detector to compare the modulated continuous signal to the continuous signal. The PLL generates an output signal equal to the modulation added to the continuous signal. The modulation added to the continuous signal may be used to recover the non-modulated continuous signal such as a carrier signal.

Although phase-locked loops can be implemented using specialized integrated circuits, the functionality of the PLL can be performed by a set of software instructions that can be executed by a processor of a data acquisition device. For example, the receiver within the DAS interrogator may convert the analog optical signals into analog electrical signals and digitize the analog electrical signals. A processor may execute a set of instructions to isolate the trigger signal from other signals that were transmitted by the fiber optic cable.

At block 512, the recovered carrier signal may be multiplied by the modulated continuous signal. At block 516, the multiplied signal may be passed through a low pass filter to suppress the higher-frequency components of the signal. At block 520, a threshold operator may be applied to the filtered, multiplied signal. The threshold operator may be used to determine if a particular characteristic of the filtered, multiplied signal, such as a frequency, phase or amplitude of the signal exceeds a predetermined operator or operators. If the threshold is exceeded, then the trigger has been detected and data acquisition operations will commence. Otherwise, the process continues to manipulate the continuous signal until the threshold has been exceeded.

As shown in FIGS. 1 and 4, the data acquisition system may use multiple fiber stretchers to encode multiple signals in parallel. In some instances, each stretcher may be driven by a carrier wave at a different frequency. Blocks 504-524 may be used to identify the channel ranges that data from each fiber stretcher may be detected on, even if the signal source is no longer operational. For example, when the data source is operational the frequency of the continuous signal may be used to identify the channel range in which each stretcher encodes data. Even if the continuous signal stops, data encoded on the channel by the fiber stretcher can be detected by the data acquisition system.

Blocks 504-524 represent one way for detecting a trigger signal transmitted over a fiber optic cable using one or more interconnected integrated circuits. In some instances, blocks 504-524 may be performed entirely in software in which a processer of a data acquisition system, a processer of a server, or combinations thereof, one or more software instructions to recover the trigger signal from the one or more other signals transmitted over the fiber optic cable.

Figure 6:
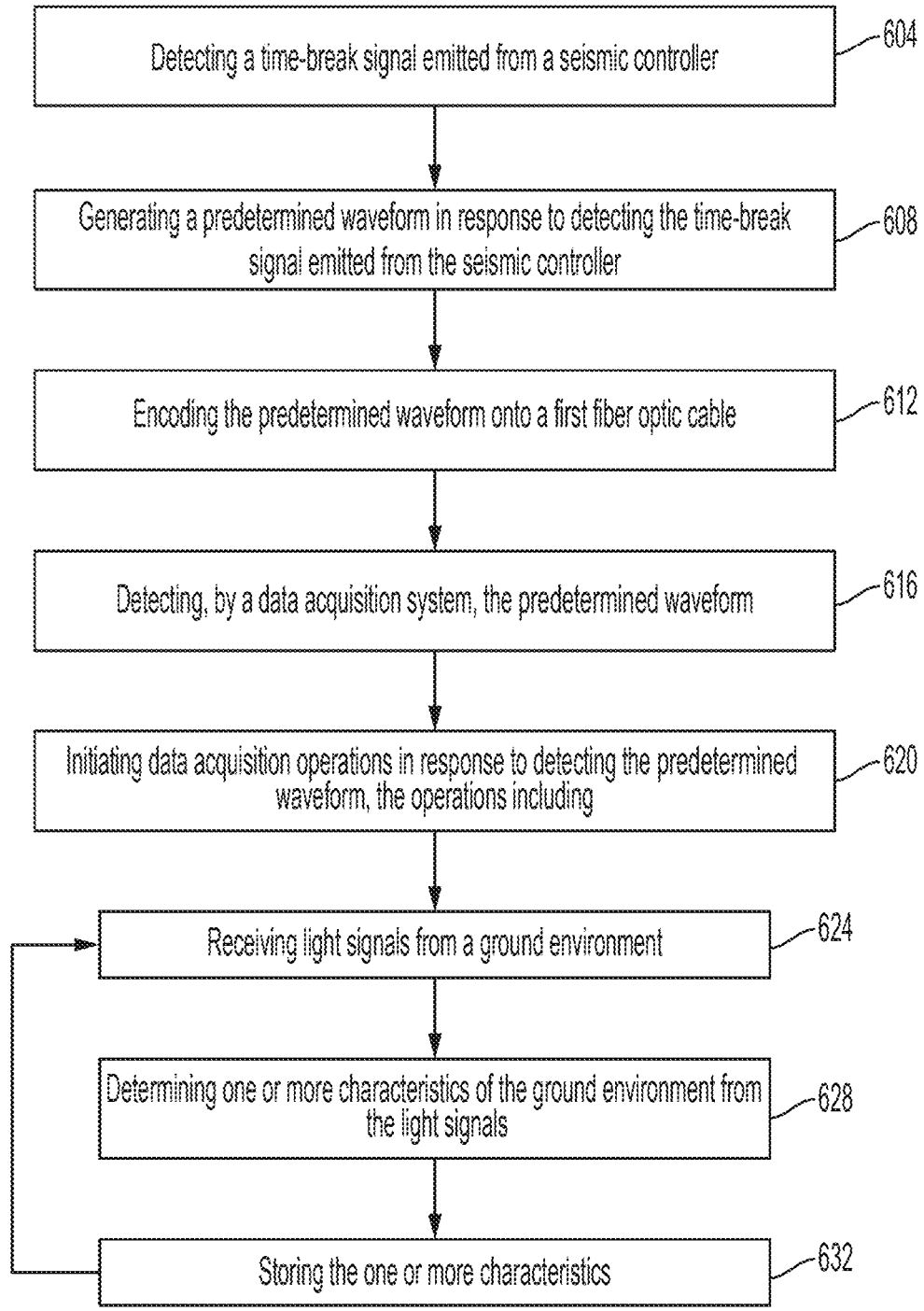
FIG. 6 is a flowchart of a process for encoding a trigger signal using an active fiber stretcher system according to at least one aspect of the disclosure.

FIG. 6 illustrates a flowchart of a process for encoding a trigger signal using an active fiber stretcher system according to aspects of the disclosure. At block 604, a time-break signal is detected. The time-break signal may be a signal generated by a seismic controller at the instant the seismic source initiates operations pumping energy into the subterranean environment. In some instances, the time-break signal may be transmitted at predetermined time interval before the seismic source initiates operations.

At block 608, a function generator generates a predetermined waveform in response to detecting the time-break signal. The predetermined waveform may be an analog signal, a digital signal such as a step function, a TTL pulse with fixed or varying polarity, pulse width, and edge width, a TTL pulse train with fixed or varying polarity, pulse width, and edge width, a modulated, time-limited signal that is modulated using amplitude modulation, frequency modulation, phase modulation, or a spread spectrum utilizing random or pseudo-random sequences; or a continuous signal with a modulated phase, frequency, amplitude, or combinations thereof. The predetermined waveform may be any signal that is predefined prior to detecting the time-break signal from the seismic source.

At block 612, the predetermined waveform may be encoded onto a fiber optic cable using a fiber stretcher. The fiber stretcher may use a piezoelectric core that deforms consistently with the application of an electrical current. In some instances, the predetermined waveform may be sufficient to drive the fiber stretcher to encode the predetermined waveform onto the fiber optic cable. In other instances, the predetermined waveform may be modulated or amplified to drive the fiber optic cable. In still yet other instances, the fiber stretcher may include its own power source to encode received signals, like the predetermined waveform, onto the fiber optic cable.

At block 616, a data acquisition system may detect the predetermined waveform on the fiber optic cable. In some instances, the predetermined waveform may be detected using one or more of the blocks described in FIG. 5. The predetermined waveform may be used to initiate data acquisition operations to avoid processing false data. For example, data acquisition system may detect signals on the fiber optic cable that are not associated with a seismic event such as signal noise or the like. At block 620, data acquisition operations can be initiated by the data acquisition system in response to detecting the predetermined waveform on the fiber optic cable. For example, the predetermined waveform may indicate a starting instant in which received data is recorded or presented to a user. Data received prior to detecting the predetermined waveform may be discarded or omitted from presentation.

At blocks 624, the data acquisition system receives signals from the subterranean environment. In some instances, the data acquisition system may receive light signals from multiple subterranean environments. In those instances, the data acquisition system may differentiate signals from different subterranean environments, monitored via dedicated fiber optic cables, through the frequency or phase of the individual light signals. In other instances, the data acquisition system may receive data associated with one or more subterranean environments from other data acquisition devices.

At block 628, one or more characteristics of the light signal may be determined such as frequency, amplitude, or phase. The characteristics may indicate the medium of one or more portions of the subterranean environment. For example, a seismic event can cause an acoustic wave to travel through the subterranean environment. The acoustic wave will travel through different mediums differently. For example, the acoustic wave will travel faster in denser materials like water or rock than in less dense materials like sand or dirt. This difference can be detected as the acoustic wave travels across a fiber optic cable. The characteristics of a light signal within the fiber optic cable may change proportionally with the acoustic wave traveling through the ground. The change in characteristics of the light signal can be measured to determine the medium of the subterranean environment at the fiber optic cable.

The data acquisition system may use backscatter signals to obtain measurements at discrete locations along the fiber optic cable. The data acquisition system may use the backscatter signals to determine the composition of the subterranean environment at each discrete location of the fiber optic cable by comparing each backscatter signal to a preceding or subsequently received backscatter signal. As a result, a full detailed map of the composition of the subterranean environment can be determined from a seismic event. Backscatter can be induced to increase or decrease the number of backscatter signals, for example by modifying a composition of the fiber optic cable, and thereby increase or decrease the resolution of the detailed map.

At block 632, the received light signals and the measurements may be stored in a storage device. In some instances, the storage device may be a local flash or magnetic memory device positioned in or near the data acquisition device. In other instances, the storage device may be located on a remote server or is part of a cloud storage network. In those instances, the data acquisition device may store a copy of the received signals and the one or more characteristics and additionally transmit the signals and the one or more characteristics to a remote device through a wired or wireless connection with the remote device. In some instances, the one or more characteristics and any received light signals may be presented through an interface, such as a graphical user interface, to a user.

In some instances, the measurements may be used to determine a location for a drilling platform, or a location to initiative another seismic event. For example, the measurements may indicate the presence of hard rock, metal deposits, etc. that would make drilling undesirable at the location of the seismic event. The measurements may indicate a more favorable location as an alternative drilling site. In other instances, the measurements may be used to define a drilling path that avoids or prefers certain materials within the subterranean environment.

Figure 7:
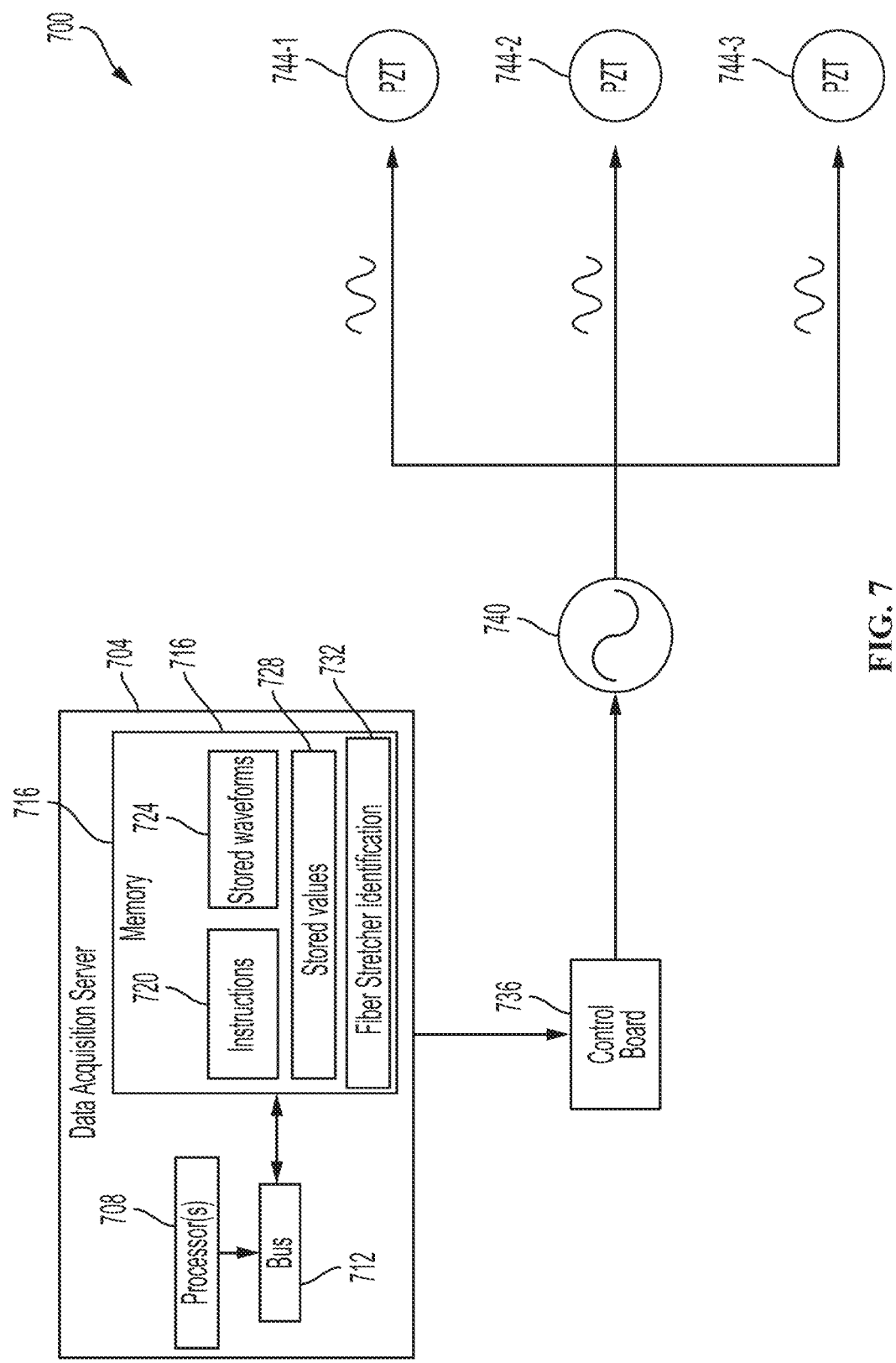
FIG. 7 is a block diagram of a vertical seismic profile for a data acquisition system according to at least one aspect of the disclosure.

FIG. 7 illustrates a block diagram of a data acquisition system 700 configured to automatically detect fiber stretcher locations according to aspects of the disclosure. In some instances, this may be necessary as the location of each of the fiber stretchers within the optical data stream may not be known a priori. This is typically the case when the fiber stretchers are housed in an external module such as depicted in FIG. 4 and the length of the fiber-optic cable connecting the DAS interrogator to the external fiber stretcher module is unknown. The channel range for each fiber stretcher can be automatically determined by transmitting a predetermined signal to a fiber stretcher. The fiber stretcher may encode the predetermined signal onto the fiber optic cable where it may be received and analyzed by a data acquisition server. The analysis of the received signals can be used to determine a range of channels to monitor to detect communications from that fiber stretcher. The identified signal channels for each fiber stretcher can then in turn be used to configure the data acquisition device such that operations of a seismic controller and the corresponding seismic event can be accurately recorded. In addition, by defining the channel ranges for each fiber stretcher, the likelihood of false positives and false negatives can be reduced and the integrity and accuracy of collected data can be increased.

Data acquisition system 700 may include a data acquisition device 704 configured to collect measurements of a seismic event occurring in a subterranean environment as well as automatically detect channel ranges of fiber stretchers that encode signals over a fiber optic cable. In some instances, data acquisition device 704 may be a data acquisition server that is centrally located from the device that collects measurements of the seismic event. In those instances, the data acquisition server may transmit the detected channel ranges of fiber stretchers to a device, which can collect measurements of the seismic event, such as DAS interrogator 204 of FIG. 2.

Data acquisition device 704 includes one or more processors 708 connected through a bus 712 to memory 716. Memory 716 may be volatile or non-volatile memory that includes a set of software instructions 720, executed by the one or more processors 708 to determine the location of fiber stretchers on a connected fiber optic cable. Memory 716 may also include stored waveforms 724. Stored waveforms include waveforms used to determine the location of fiber stretchers and the waveforms detected by data acquisition device. For example, stored waveforms may be used to select a particular waveform that would likely determine a location of a particular fiber stretcher.

Memory 716 may also include stored values 728 that includes, among other things, the determined channel ranges of one or more fiber stretchers, the parameters used to configure the data acquisition device, one or more characteristics of the subterranean environment, and the like. Memory 716 may include a fiber stretcher identification, which indicates, for each fiber stretcher that encodes a signal onto the fiber optic cable, an identification value such as a universally unique identifier or UUID that corresponding to the fiber stretcher. In some instances, the fiber stretcher may identify itself by encoding a signal with the fiber stretcher's UUID. In other instances, the data acquisition device may assign a UUID to a fiber stretcher once the fiber stretcher is connected to the fiber optic cable.

Data acquisition device 704 may be connected to a control board 736 that drives function generator 740. Although depicted as being external from data acquisition device, in some instances, control board 736 and function generator 740 may be included within the data acquisition device 704. Control board may provide power and an indication of a particular signal that the function generator is to emit. For example, control board may cause function generator 740 to emit a signal on an electrical or optical cable connected to one or more fiber stretchers 744-1 to 744-3. Although three fiber stretchers are depicted any number of fiber stretchers may be connected to and receive signals from function generator 640.

Function generator 740 may generate any predetermine signal. For example, function generator may generate a continuous signal, such as a sine wave or step function, a modulated time-limited signal, a pulse, combinations thereof, or the like. The predetermined signal may be transmitted to each of one or more fiber stretchers 744-1 to 744-3 where the predetermined signal may be encoded onto fiber optic cable 748. Fiber optic cable 748 may be a fiber optic cable that is connected to data acquisition device 704 via a DAS interrogator (not shown) as well as embedded into the ground. Fiber stretchers 744-1 to 744-3 may also encode signals received from one or more other devices such as a seismic controller, a GPS receiver, etc. Data acquisition device 704 may detect the predetermined signal, as encoded by each of the one or more fiber stretchers 744-1 to 744-3, to identify a channel range for each fiber stretcher that data acquisition device 704 can monitor to detect signals encoded by each fiber stretcher.

Figure 8:
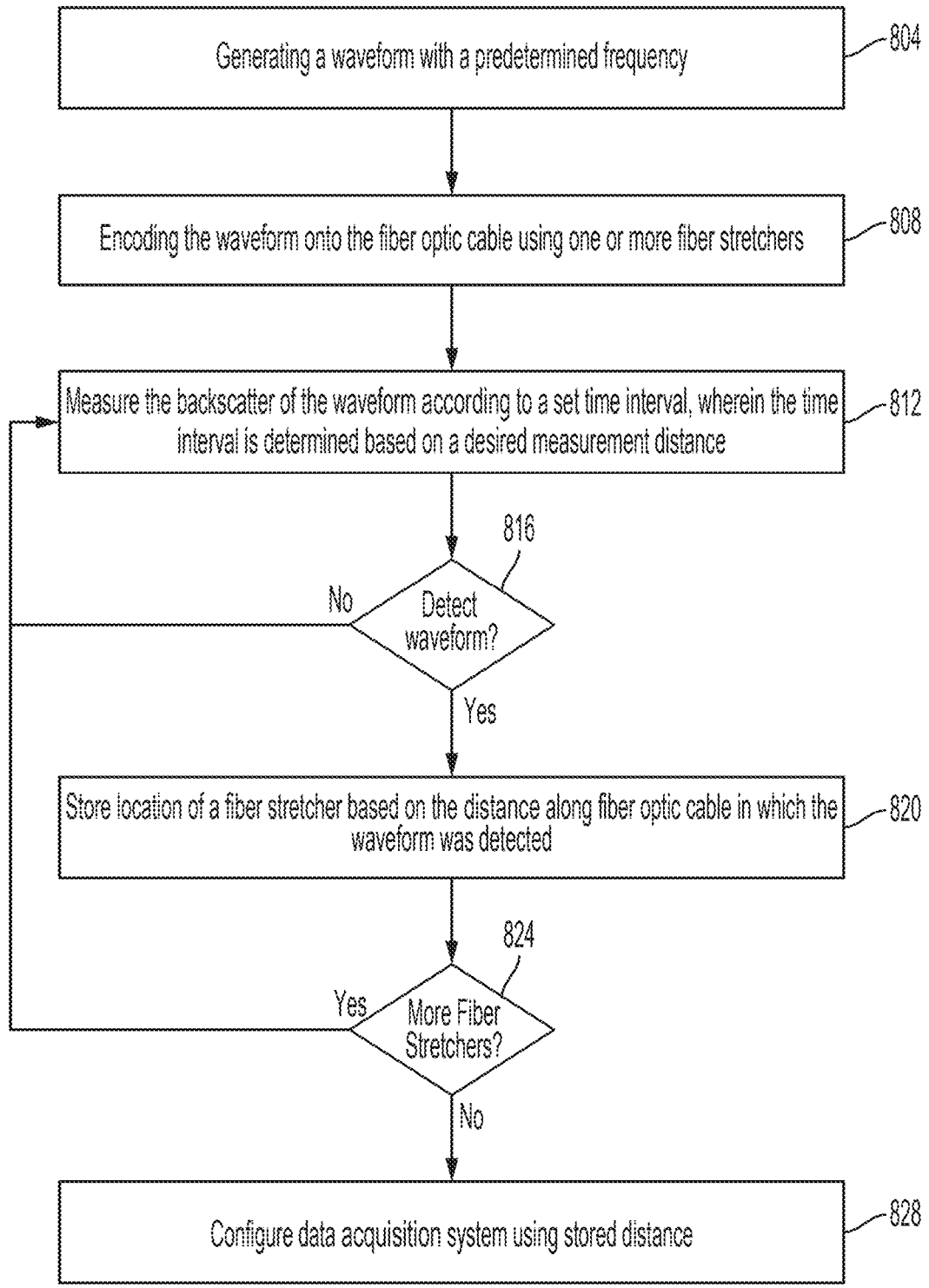
FIG. 8 is a flowchart of a process for calibrating a vertical seismic profile for a data acquisition system according to at least one aspect of the disclosure.

FIG. 8 illustrates a flowchart of a process for calibrating a DAS vertical seismic profile data acquisition system according to aspects of the disclosure. Signals received from fiber stretchers may be detected on a particular signal channel range within the optical data stream that may be based on physical location, gauge length, fiber stretcher sensitivity, or the like. Signals from each fiber stretcher may be received over particular signal channel range that may be unknown to data acquisition device 704. If not properly calibrated, received light signals, such as the time-break signal used to initiate operations, may not be detected or may be discarded as signal noise. The process of FIG. 8 can automatically calibrate a data acquisition device to detect signals from fiber stretchers thereby improving the accuracy of the data acquisition system by reducing the likelihood of false positives false negatives and the like.

At block 804, a predetermined waveform can be generated by a function generator. Any predetermined waveform may be generated such as, but not limited to: a continuous signal, such as a sine wave or step function; a modulated time-limited signal; a pulse; combinations thereof, or the like. At block 808, the predetermined signal waveform may be transmitted to one or more fiber stretchers where the fiber stretchers may encode the predetermined signal waveform onto a fiber optic cable. In some instances, the predetermined waveform may be transmitted to each of the one or more fiber stretchers in parallel such that each fiber stretcher receives the predetermined waveform at substantially the same time. In other instances, the predetermined waveform may be transmitted to one fiber stretcher at a time in series. In those instances, any particular order of fiber stretchers may be selected to receive the predetermined waveform. Each fiber stretcher may encode the received predetermined waveform onto the fiber optic cable connected to a DAS interrogator such as DAS interrogator 204 of FIG. 2. Each of the fiber stretchers may encode the predetermined waveform onto a fiber optic cable connected to a data acquisition device via a DAS interrogator.

At block 812, the data acquisition device may receive signals over the fiber optic cable and collect, among other things, acoustic phase data such as dynamic strain. In some instances, data acquisition device may receive signals over a time period of a predetermined duration that is selected automatically or by a field engineer. At block 816, it is determined if the predetermined waveform has been detected. If the predetermined waveform is not detected, control may return to block 812 where a new set of signals are received over another time period of the predetermined duration. Otherwise, if the predetermined waveform has been detected, then the data acquisition device sets the fiber stretcher channel range to a range of consecutive channels over which the predetermined waveform is detected.

For example, the received signals are converted into the frequency domain using a Fourier transform, or the like, as a function of acoustic energy. The frequency domain can provide an indication of a range of channels over which the predetermined waveform is detected. In some instances, such as when multiple fiber stretchers are positioned on the fiber optic cable, corresponding channel ranges may be detected for each fiber stretcher.

In some instances, each detected channel range may be reduced using a signal strength threshold. For example, some channels of a channel range may have too low of an acoustic energy value that may be difficult to detect over regular noise on the channel. These channels may be eliminated from the channel range. This may reduce the likelihood of the data acquisition system detecting a false positive or false negative. The signal strength threshold may be automatically determined based on the amplitude of the detected predetermined signal and the sensitivity of each fiber stretcher, selected by during manufacturing of the data acquisition device, or selected by a field engineer.

At block 820, the detected channel ranges for a fiber stretcher are stored in the data acquisition device. At block 824, it is determined if there are more fiber stretchers. If there are more fiber stretchers control may return to 812 where a new set of signals may be used to detect channel ranges for the additional fiber stretchers. In some instances, a single receipt of a signal may be used to detect each fiber stretcher. In those instances, it may not be necessary to return to 812 to receive more signals, but instead return to block 816 where the already received signals may be used to determine channel ranges for the additional fiber stretchers.

At block 828, the detected channel ranges for each fiber stretcher are used to configure the data acquisition device. Configuring the data acquisition device with the fiber stretcher's channel ranges increases the accuracy and detection time of signals encoded by a particular fiber stretcher such as a time-break signal, GPS signal, time sensitive data, etc. Once configured, the data acquisition device can commence data acquisition operations and the process of FIG. 8 terminates.

The blocks of the processes described by FIGS. 5, 6, and 8 can be executed once or more than once and in-order or out-of-order without departing from the spirit or the scope of this disclosure.

In some aspects, systems and methods for analyzing and controlling drilling fluids are provided according to the following examples: Example 1 is a system comprising: an active fiber stretcher assembly including: a trigger circuit to detect a time-break signal emitted from a seismic controller; a function generator coupled to the trigger circuit to receive a signal from the trigger circuit that the time-break signal has been detected and, in response to receiving the signal from the trigger circuit, to generate a predetermined waveform; and a fiber stretcher unit coupled to the function generator to encode the predetermined waveform onto a fiber optic cable; a data acquisition system communicatively coupled to the fiber optic cable, the data acquisition system including: a light source to transmit light signals through the fiber optic cable into a subterranean environment; and an optical receiver to receive the predetermined waveform from the active fiber stretcher assembly and a returning light signal from the subterranean environment; and a processor to detect the predetermined waveform, in response to detecting the predetermined waveform, to obtain one or more measurements from a returning light signal from the subterranean environment.

The system of example 1 can include any combination of the following features: (1) the data acquisition system is configured to receive a plurality of returning light signals from the subterranean environment, the plurality of returning light signals being continuously received over time, and wherein one or more measurements are obtained from each returning light signal of the plurality of returning light signals that are received by the data acquisition system after the predetermined waveform; (2) the fiber stretcher unit includes a plurality of fiber stretchers to encode a plurality of signals onto the fiber optic cable in parallel; (3) the data acquisition system further includes: a server communicatively coupled to the fiber stretcher unit, the server including instructions on a non-transitory computer-readable medium that are executable to identify a channel range of one or more fiber stretchers of the fiber stretcher unit and to transmit the channel range of the one or more fiber stretchers to the data acquisition system; (4) the time-break signal is indicative of an initiation of a seismic event; (5) the one or more measurements correspond to characteristics of an acoustic wave within the subterranean environment; and (6) the one or more measurements indicate a composition of a material in the subterranean environment.

Example 2 is a method comprising: detecting a time-break signal emitted from a seismic controller, the time-break signal being emitted substantially contemporaneously with a seismic event for a subterranean environment; generating a predetermined waveform in response to detecting the time-break signal emitted from the seismic controller; encoding, using a first fiber stretcher, the predetermined waveform onto a fiber optic cable communicatively coupled to a data acquisition system; detecting, by the data acquisition system, the predetermined waveform on the fiber optic cable; and initiating, in response to detecting the predetermined waveform by the data acquisition system, data acquisition operations including: receiving, during the seismic event, light signals returning from a portion of the fiber optic cable in the subterranean environment; determining one or more characteristics of the subterranean environment from the light signals; and storing the one or more characteristics.

The system of example 2 can include any combination of the following features: (1) the data acquisition system continuously receives light signals over the fiber optic cable and wherein light signals received prior to detecting the predetermined waveform are discarded; (2) the time-break signal is indicative of the initiation of the seismic event; (3) encoding, using a second fiber stretcher, a communication onto the fiber optic cable in parallel with the predetermined waveform; (4) configuring the data acquisition system to detect encoded transmissions from the first fiber stretcher by: transmitting, by a server, a carrier wave to the first fiber stretcher; encoding, by the first fiber stretcher the carrier wave onto the fiber optic cable; and detecting, by the data acquisition system, the carrier wave on the fiber optic cable, wherein the carrier wave is detected on a particular channel range; and monitoring, by the data acquisition system, the particular channel range for the predetermined waveform; (5) the one or more characteristics measure an acoustic wave traveling within the subterranean environment; and (6) the one or more characteristics indicate a composition of a material in the subterranean environment.

Example 3 is a non-transitory computer-readable medium including instructions that are executable by one or more processors to cause the one or more processors to perform operations including: detecting a time-break signal emitted from a seismic controller, the time-break signal being emitted substantially contemporaneously with a seismic event for a subterranean environment; generating a predetermined waveform in response to detecting the time-break signal emitted from the seismic controller; encoding, using a first fiber stretcher, the predetermined waveform onto a fiber optic cable communicatively coupled to a data acquisition system; detecting the predetermined waveform on the fiber optic cable; and initiating, in response to detecting the predetermined waveform, data acquisition operations including: receiving, during the seismic event, light signals returning from a portion of the fiber optic cable in the subterranean environment; determining one or more characteristics of the subterranean environment from the light signals; and storing the one or more characteristics.

The system of example 3 can include any combination of the following features: (1) light signals are continuously received over the fiber optic cable and wherein light signals received prior to detecting the predetermined waveform are discarded; (2) the operations further include: encoding a communication onto the fiber optic cable in parallel with the predetermined waveform; (3) [0079] the time-break signal is indicative of the initiation of the seismic event; (4) the one or more characteristics represents attributes of an acoustic wave within the subterranean environment; and (5) the one or more characteristics indicate a composition of a material in the subterranean environment.

Specific details are given in the above description to provide a thorough understanding of the embodiments. However, it is understood that the embodiments may be practiced without these specific details. For example, well-known processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, or any combination thereof. When implemented in software, firmware, middleware, scripting language, microcode, or combinations thereof, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, program statements, or combinations thereof. A code segment may be coupled to another code segment or a hardware circuit by passing or receiving information, data, arguments, parameters, memory contents, or combinations thereof. Information, arguments, parameters, data, etc. may be passed, forwarded, or transmitted via any suitable means including memory sharing, message passing, token passing, network transmission, etc.

For implementations in firmware, software, or combinations thereof, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices, other machine readable mediums for storing information, or combinations thereof. The term "non-transitory computer-readable medium" includes, but is not limited to portable or fixed storage devices, optical storage devices, or various other storage mediums capable of storing that can persistently contain or carry instruction(s), data, or combinations thereof.

While the principles of the disclosure have been described above in connection with specific apparatuses and methods, it is to be clearly understood that this description is made only by way of example and not as limitation on the scope of the disclosure.

What is claimed is:

1. A system comprising:
   an active fiber stretcher assembly including:
      a trigger circuit to detect a time-break signal emitted from a seismic controller;
      a function generator coupled to the trigger circuit to receive a signal from the trigger circuit that the time-break signal has been detected and, in response to receiving the signal from the trigger circuit, to generate a predetermined waveform; and
      a fiber stretcher unit coupled to the function generator to encode the predetermined waveform onto a fiber optic cable; and
   a data acquisition system communicatively coupled to the fiber optic cable, the data acquisition system including:
      a light source to transmit light signals through the fiber optic cable into a subterranean environment;
      a server communicatively coupled to the fiber stretcher unit, the server including a non-transitory computer-readable medium on which are instructions that are executable to identify a channel range of one or more fiber stretchers of the fiber stretcher unit and to transmit the channel range of the one or more fiber stretchers to the data acquisition system;
      an optical receiver to receive the predetermined waveform from the active fiber stretcher assembly and a returning light signal from the subterranean environment; and
      a processor to detect the predetermined waveform, in response to detecting the predetermined waveform, to obtain one or more measurements from a returning light signal from the subterranean environment.

2. The system of claim 1, wherein the data acquisition system is configured to receive a plurality of returning light signals from the subterranean environment, the plurality of returning light signals being continuously received over time, and wherein one or more measurements are obtained from each returning light signal of the plurality of returning light signals that are received by the data acquisition system after the predetermined waveform.

3. The system of claim 1, wherein the fiber stretcher unit includes a plurality of fiber stretchers to encode a plurality of signals onto the fiber optic cable in parallel.

4. The system of claim 1, wherein the one or more measurements indicate a composition of a material in the subterranean environment.

5. The system of claim 1, wherein the time-break signal is indicative of an initiation of a seismic event.

6. The system of claim 1, wherein the one or more measurements correspond to characteristics of an acoustic wave within the subterranean environment.

7. A method comprising:
   detecting a time-break signal emitted from a seismic controller, the time-break signal being emitted substantially contemporaneously with a seismic event for a subterranean environment;
   generating a predetermined waveform in response to detecting the time-break signal emitted from the seismic controller;
   encoding, using a first fiber stretcher, the predetermined waveform onto a fiber optic cable communicatively coupled to a data acquisition system;
   configuring the data acquisition system to detect encoded transmissions from the first fiber stretcher by:
      transmitting, by a server, a carrier wave to the first fiber stretcher;
      encoding, by the first fiber stretcher, the carrier wave onto the first fiber stretcher;
      detecting, by the data acquisition system, the carrier wave on the fiber optic cable, wherein the carrier wave is detected on a particular channel range; and
      monitoring, by the data acquisition system, the particular channel range for the predetermined waveform;
   detecting, by the data acquisition system, the predetermined waveform on the fiber optic cable; and
   initiating, in response to detecting the predetermined waveform by the data acquisition system, data acquisition operations including:
      receiving, during the seismic event, light signals returning from a portion of the fiber optic cable in the subterranean environment;
      determining one or more characteristics of the subterranean environment from the light signals; and
      storing the one or more characteristics.

8. The method of claim 7, wherein the one or more characteristics indicate a composition of a material in the subterranean environment.

9. The method of claim 7, wherein the data acquisition system continuously receives light signals over the fiber optic cable and wherein light signals received prior to detecting the predetermined waveform are discarded.

10. The method of claim 7, wherein the time-break signal is indicative of an initiation of the seismic event.

11. The method of claim 7, further comprising:
   encoding, using a second fiber stretcher, a communication onto the fiber optic cable in parallel with the predetermined waveform.

12. The method of claim 7, wherein the one or more characteristics measure an acoustic wave traveling within the subterranean environment.

13. A non-transitory computer-readable medium including instructions that are executable by one or more processors to cause the one or more processors to perform operations including:
- detecting a time-break signal emitted from a seismic controller, the time-break signal being emitted substantially contemporaneously with a seismic event for a subterranean environment;
- generating a predetermined waveform in response to detecting the time-break signal emitted from the seismic controller;
- encoding, using a first fiber stretcher, the predetermined waveform onto a fiber optic cable communicatively coupled to a data acquisition system;
- detecting the predetermined waveform on the fiber optic cable;
- identifying a channel range of the first fiber stretcher;
- transmitting the channel range of the first fiber stretcher to the data acquisition system; and
- initiating, in response to detecting the predetermined waveform, data acquisition operations including:
  - receiving, during the seismic event, light signals returning from a portion of the fiber optic cable in the subterranean environment;
  - determining one or more characteristics of the subterranean environment from the light signals; and
  - storing the one or more characteristics.

14. The non-transitory computer-readable medium of claim 13, wherein the one or more characteristics represents attributes of an acoustic wave within the subterranean environment.

15. The non-transitory computer-readable medium of claim 13, wherein the one or more characteristics indicate a composition of a material in the subterranean environment.

16. The non-transitory computer-readable medium of claim 13, wherein light signals are continuously received over the fiber optic cable and wherein light signals received prior to detecting the predetermined waveform are discarded.

17. The non-transitory computer-readable medium of claim 13, wherein the operations further include:
- encoding a communication onto the fiber optic cable in parallel with the predetermined waveform.

18. The non-transitory computer-readable medium of claim 13, wherein the time-break signal is indicative of an initiation of the seismic event.

* * * * *